United States Patent [19]

Yokota et al.

[11] Patent Number: 4,609,272
[45] Date of Patent: Sep. 2, 1986

[54] FINDER SYSTEM OF HIGH IMAGE MAGNIFICATION

[75] Inventors: Hideo Yokota, Kanagawa; Masatake Kato, Tokyo; Tetsuharu Nishimura, Kanagawa, all of Japan

[73] Assignee: Canon Kabushiki Kaisha

[21] Appl. No.: 750,685

[22] Filed: Jun. 28, 1985

[30] Foreign Application Priority Data

Jul. 2, 1984 [JP] Japan ............................ 59-137016
Jul. 2, 1984 [JP] Japan ............................ 59-137017

[51] Int. Cl.$^4$ ............................................. G03B 13/02
[52] U.S. Cl. ........................................ 354/225; 354/155
[58] Field of Search ................................. 354/155, 225

[56] References Cited

U.S. PATENT DOCUMENTS 3,541,919 11/1970 Weyrauch ............................ 354/225
4,021,823 5/1977 Miyata ............................ 354/155 X

*Primary Examiner*—Michael L. Gellner

*Attorney, Agent, or Firm*—Toren, McGeady, Stanger, Goldberg & Kiel

[57] ABSTRACT

The disclosed finder system is constructed with three prisms. The first prism has a first entrance face, a first reflection face and a first exit face. The second prism has a second entrance face in contact with the first exit face, a second reflection face, and a second exit face. The third prism has a third entrance face in contact with the second exit face, a pair of roof-type reflection faces, a third reflection face in a common plane with the third entrance face, and a third exit face. Light entering through a photographic objective lens reflects from a quick return mirror to a focusing screen on which an image of an object forms. Light from the image reflects from the first reflection face to a direction parallel with an optical axis of the lens. The second reflection face then reflects the light progressively farther away from the optical axis to the pair of roof faces. The light then reflects progressively nearer the optical axis to the third reflection face, and then therefrom to an eyepiece for observing the finder image.

16 Claims, 6 Drawing Figures

FINDER SYSTEM OF HIGH IMAGE MAGNIFICATION

BACKGROUND OF THE INVENTION

1. Field of the Invention

This invention relates to finder optical systems, and more particularly to finder optical systems suited for single lens reflex cameras or so-called electronic cameras of the TTL optical type using image pickup tubes or solid state image pickup elements such as CCDs.

2. Description of the Prior Art

The development of 35 mm single lens reflex cameras has been based on the use of pentagonal roof-type prisms. The typical finder optical system for a single lens reflex camera is schematically illustrated in FIG. 1, showing a flippable total reflection mirror 101, shutter unit 102, a film plane 103, a focusing screen 104, a pentagonal roof-type prism 105, an eyepiece lens 106, and an observer's eye 107. The optical performance of such a camera is excellent, for the view area compared to the film area, or the field-of-view ratio, is 90% or more. Moreover, with the standard objective lens, the image magnification is 0.8× or more. This finder optical system also offers the advantage that the entire body is relatively small in size.

However, in adapting such pentagonal roof-type prisms to optical finder systems of recently developed electronic cameras using so-called CCD or similar image pickup devices, it is difficult to obtain a view and an image magnification equal to those of the conventional single lens reflex cameras. It also becomes difficult to minimize the size of the camera.

This is because:

(i) The effective image frame in the image pickup device of, for example, ⅔ of an inch, measured diagonally, equals about a quarter of the 35 mm film frame. If the conventional pentagonal roof type prism is employed, the length of the optical path is too long to easily obtain a wide view area and a high image magnification;

(ii) The electrical processing circuits occupy a large space in the rear of the image pickup device. This leads to an increase in the distance from the image plane of the photographic lens to the rearmost wall of the camera housing. For this reason, the pupil position of the finder must be shifted a great deal behind the camera. As a result, it becomes difficult to obtain the desired wide view area and the high image magnification;

(iii) The photographic lens must be constructed in the telecentric form for the purpose of color separation. When splitting off part of the light from the photographic lens to the finder, the rays of light greatly diverge, causing a large increase of the size of the reflection mirror; and (iv) The distance from the beam splitter to the image pickup device must be increased to accommodate the low pass filter, infrared cut filter, and protection glass plate. Thus, the size of the complete camera becomes too large.

For reference, an example of a finder optical system having more than 90% field-of-view ratio using the conventional pentagonal roof type prism in an electronic camera is schematically shown in FIG. 2. The Figure illustrates a photographic lens 200; a beam splitter unit 201; a low pass filter 202; a shutter unit 203; an image receiving surface of the image pickup device 204; a package 205 of the image pickup device with a protection glass layer having an infrared cut effect at the front; a finder 206 including a system for vertically laterally correcting the image; a focusing screen 207; an electrical circuit unit 208 for processing the video signals; and the observer's eye 209.

In general, the higher the image magnification, the easier the finder image is to observe. The image magnification, $\gamma$, can be expressed terms of the standard focal length $f\theta$ of the photographic lens and the focal length fe of the eyepiece as $\gamma = f\theta/fe$. For an increase of the image magnification $\gamma$, since the focal length $f\theta$ of the standard lens has a nearly constant value, it is necessary to decrease the focal length fe of the eyepiece. Because the eyepiece is arranged so that its front focal point lies near the focusing screen in the finder optical system, the length of the optical path of the correct image forming optical system from the focusing screen to the eyepiece must be as short as possible. Now, assuming that the image pickup device is ⅔ inches with the standard lens having a focal length $f\theta = 12.5$ mm, when the image magnification is taken at $\gamma = 0.5$, the value of the focal length fe is found to be 25 mm.

To obtain a high view area ratio, the focusing screen must be as large in size as the effective image pickup area. Moreover, the correct image forming system must be made large enough to create the optical path that permits observation of the entire area of the focusing screen.

In FIG. 2, to obtain a view area of at least 90% with an image magnification of at least $\gamma = 0.5$, the length of the optical path from the focusing screen to the front principal plane of the eyepiece must be made almost equal to the focal length of the eyepiece, for instance, 25 mm. Secondly, all rays of light from the focusing screen must enter the eyepiece. A pentagonal roof type prism to fulfill these requirements is possible. As shown in FIG. 2, however, the eyepiece must be placed farther away from the eye 209, because the prism 210 is positioned at the most forward point in the finder unit 206. The eyepiece 211 must also be arranged adjacent the exit face of the prism 210. The eye is placed at a distance almost equal to the focal length of the eyepiece from the rear principal point thereof. As shown in FIG. 2, the eye 209 is spaced apart from the eyepiece 211. The interval between the principal points of the eyepiece thus has to be very long. This is very difficult to realize.

As will be understood from the foregoing, using the prior known prism in the finder optical system of the electronic camera whose effective image pickup area is relatively small, makes it very difficult to achieve a high view area ratio and a high image magnification.

SUMMARY OF THE INVENTION

An object of the present invention is to provide a finder of high image magnification.

Another object is to provide a finder of high view area ratio.

Still another object is to provide a finder of small size.

A further object is to provide a finder suited for use in a camera having a relatively small image format, such as an electronic camera.

DETAILED DESCRIPTION OF THE PREFERRED EMBODIMENTS

Figure 1:
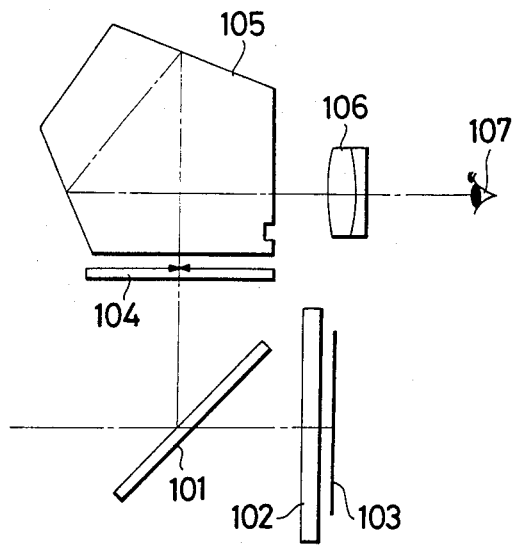
FIG. 1 is a schematic sectional view of a prior art finder optical system of the 35 mm single lens reflex camera.
Figure 2:
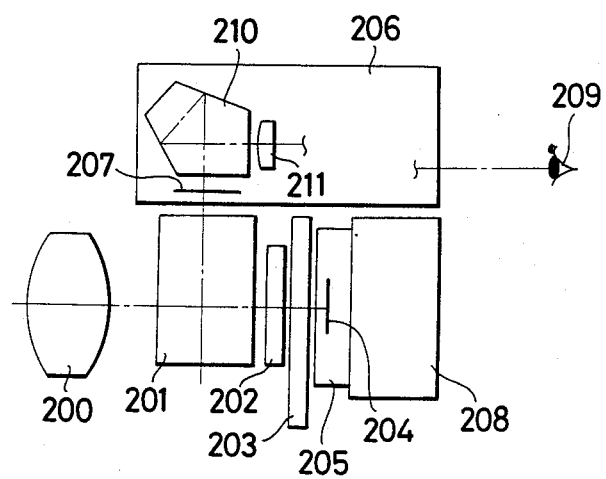
FIG. 2 is a schematic sectional view illustrating an example of application of the finder of FIG. 1 to the electronic camera.
Figure 3:
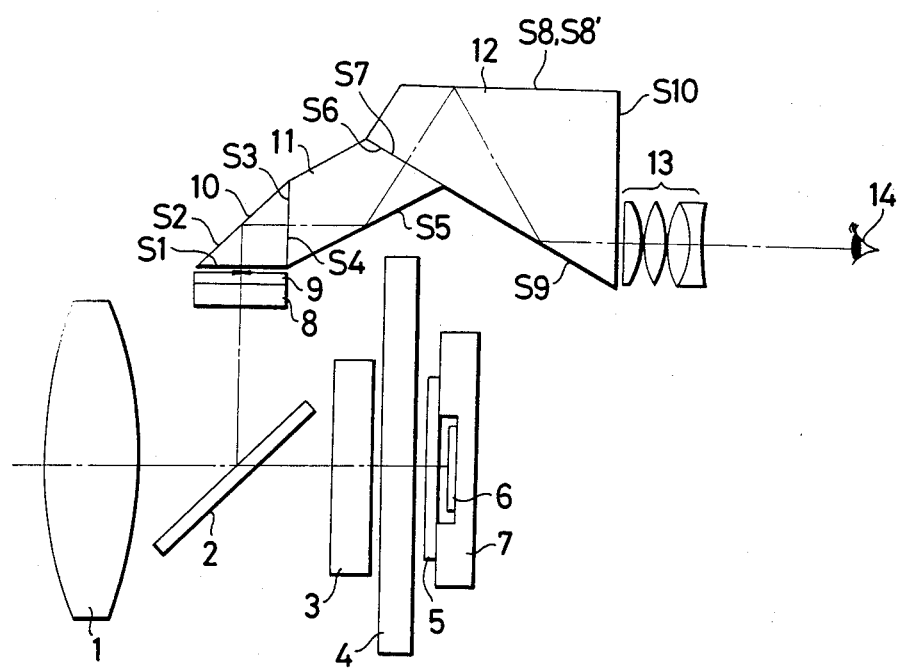
FIG. 3 is a longitudinal section view of a first embodiment of a finder according to the present invention.

FIG. 3 shows one embodiment of the finder according to the present invention applied to an electronic camera element 1 is a photographic lens of the telecentric type; 2 is a quick return mirror arranged upon making of an exposure to clear the image bearing beam; 3 is a low pass filter; 4 is a shutter unit; 5 is a protection glass plate in front of an image receiving surface 6 of an image pickup device in a package 7. Light coming from an object and entering through the lens 1 is reflected by the mirror 2 to a focusing screen 9 positioned at an almost equivalent position to the image pickup plane 6 after the reflected light has passed through an optical path correction plate 8 for imparting to the object image on the focusing screen a similar spherical aberration to that in the image formed on the image pickup plane 6. Light radiated from the image on the focusing screen 9 enters a first prism 10 at a face S1 and is reflected by a face S2 to a direction almost parallel with an optical axis of the photographic system, exiting from a face S3. Then, it enters a second prism 11 at a face S4 and is reflected by a face S5 to a direction progressively farther away from the optical axis, exiting from a face S6. It then enters a third prism 12 at a face S7 and is reflected by a roof type face having two areas S8 and S8' to a face S9 which lies almost in a common plane with the entrance face S7, and therefrom reflected to a direction almost parallel with the optical axis, exiting from a face S10. It then enters an eyepiece 13 through which an eye 14 observes a finder image.

Figure 4:
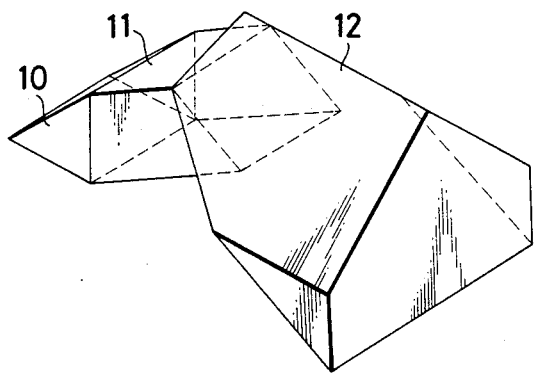
FIG. 4 is a perspective view illustrating how the three prisms of FIG. 3 are assembled with each other.

The forms of the first, second and third prisms 10, 11 and 12 of FIG. 3 are shown in FIG. 4.

With this prism assembly, the laterally vertically inverted image on the focusing screen 9 is corrected in both directions in reflecting from the face S5 of the second prism 11 and the roof type face S8, S8' and face S9 of the third prism 12 successively.

In this embodiment, the reflection faces S2, S5 and S9 may utilize total reflection, or may be silvered.

In this embodiment, the reflection face S2 of the first prism 10 is so oriented that the reflected light takes a direction almost parallel wih the optical axis of the photographic lens 1, and the reflection face S9 of the third prism 12 is so oriented that the reflected light also takes a direction almost parallel with the optical axis, thereby giving an advantage of minimizing the size of the finder. The term "almost parallel" as used herein means that the reflected ray makes an angle of less than ±10° with the optical axis of the photographic lens 1.

In this embodiment, to further minimize the size of the entire body of the finder, it is preferred that the entrance face S1 of the first prism 10 is oriented almost parallel to the optical axis of the photographic lens 1, and the exit face S10 of the third prism 12 is oriented almost perpendicular to the optical axis of the photographic lens.

In this embodiment, by arranging the focusing screen 9 adjacent to the entrance face S1 of the first prism 10, and by forming the first, second and third prisms 10, 11 and 12 to the above-stated shapes, a shortening of the length of the optical path from the focusing screen 9 to the eyepiece 13 is achieved, thereby making it possible to employ an eyepiece of short focal length to obtain a finger image of high magnification.

For example, in this embodiment, when the effective area of the image pickup plane 6 is taken at ⅔, the total sum of the lengths of optical path of the first, second and third prisms 10, 11 and 12 for a refractive index of 1.834 can be made shorter than 25 mm. By using a lens of 12.5 mm in the focal length as the photographic lens, a finder image magnification of $\gamma > 0.5$ is obtained.

In this embodiment, the first and second prisms 10 and 11, and the second and third prisms 11 and 12 may be either cemented in each pair, or in broken contact, provided that the air gap is in the order of 0.05 to 0.2 mm, for which the optical performance is lowered significantly. Another variation may be made such that the first, second and third prisms are formed as a unit by plastic molding.

In this embodiment, filling the optical path of the finder with as much glass as possible by making the first, second and third prisms 10, 11 and 12 of glass shortens the length of optical path of the finder optical system, thus reducing the size of the entire body of the finder optical system while still permitting a finder image of a high view area ratio of, for example, more than 0.9.

In this embodiment, instead of the focusing screen, the entrance face S1 of the first prism 10, after having been treated by frosting techniques may be used as the focusing screen.

The second and third prisms 11 and 12 are formed to such shapes that when assembled with each other, an intermediate space defined by the faces S5 and S9 accommodates the upper part of the shutter unit of, for example, the rotary type, thereby giving an advantage that the size of the entire body of the camera is minimized. Also, the reflected light from the reflection surface S2 of the first prism 10 is prevented from entering directly to the eyepiece 13 by the reflection face S5 of the second prism 11, so that a ghost image does not appear.

In this embodiment, the exit face S10 of the third prism 12 may be partly cut off, leaving only the effective area. If so, there is an advantage of reducing the size of the prism.

Figure 5:
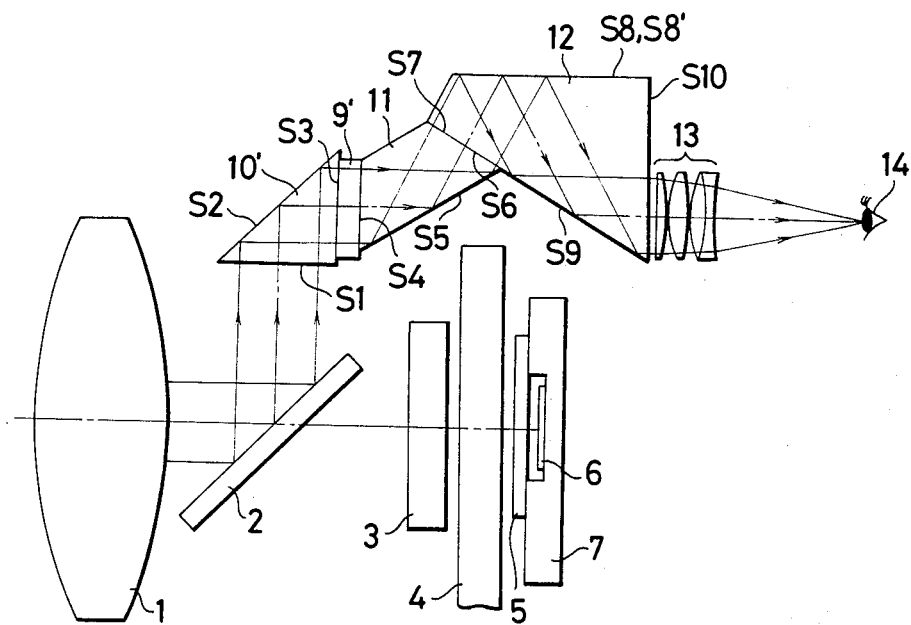
FIG. 5 is a longitudinal section view of a second embodiment of the finder according to the present invention.
Figure 6:
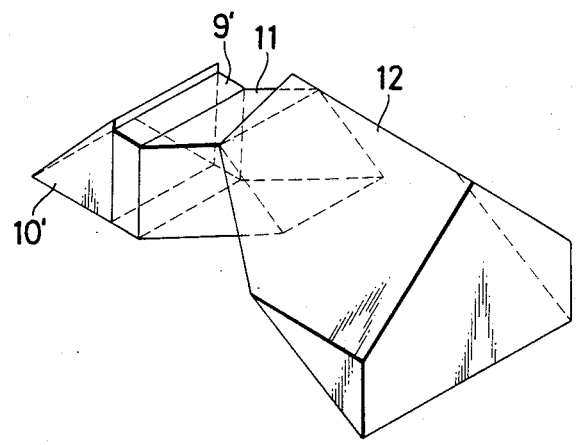
FIG. 6 is a perspective view illustrating how the three prisms and focusing screen of FIG. 5 are assembled with each other.

FIGS. 5 and 6 depict another embodiment. Light coming from an object and entering through the photographic lens 1 reflects from the quick return mirror 2 and then passes through the entrance face S1 of the first prism 10' to the reflection face S2. After being reflected therefrom to a direction almost parallel with the optical axis of the photographic system, the light goes through the exit face S3 to form an image of the object on a focusing screen 9'. Light radiated from the image on the focusing screen 9' enters the second prism 11 at the face S4, then is reflected from the face 5 to a direction progressively farther away from the optical axis of the photographic system and then exits from the face S6. Light then enters the third prism 12 at the face S7, then is reflected from the roof type face consisting of two reflection areas S8, S8', then is reflected from the face S9 almost in a common plane with the face S7 to a direction almost parallel with the optical axis of the photographic lens, and then exits from the face S10. Then, it enters the eyepiece 13 through which the finder image is observed.

A perspective view of the first, second and third prisms 10', 11 and 12 and the focusing screen 9' of FIG. 5 is given in FIG. 6.

In this embodiment, the image on the focusing screen 9' is inverted laterally longitudinally by the quick return mirror 2 and the reflection face S2 of the first prism 10'. This image is re-inverted laterally longitudinally by the reflection face S9 of the second prism 11 and the reflection faces S8 and S8' and the reflection face S9 of the third prism 12 to obtain a correct image.

In this embodiment, by arranging the focusing screen 9' adjacent to the exit face S3 of the first prism 10', and by specifying the forms of the second and third prisms 11 and 12 as described above, a shortening of the length of optical path from the focusing screen 9' to the eyepiece 13 is achieved to permit use of a lens of short focal length as the eyepiece 13. A finder image of high magnification is obtained.

For example, in this embodiment, when the effective area of the image pickup plane 6 is ⅔ in., the total sum of the lengths of optical path of the second and third prisms 11 and 12 for a refractive index of 1.7725 is reduced to less than 20 mm. With the use of a photographic lens of 12.5 mm in focal length, an image magnification of $\gamma > 0.6$ is obtained.

The second and third prisms 11 and 12 may be either cemented or in broken contact with each other, with an air separation ranging from 0.05 to 0.2 mm, for example, without causing an unduly large loss in the optical performance.

As has been described above, according to the present invention, a finder optical system of reduced size with a high view area ratio and a high image magnification can be formed. Particularly, according to the invention, in the electronic camera whose effective image area is relatively small, while preserving the high view area ratio and the high image magnification, the size of the entire body of the camera can be minimized with ease, because the space in the rear of the camera can be used with high efficiency.

What is claimed is:

1. An optical apparatus for observing an object through an objective optical system, comprising:
   optical means having an entrance face for receiving a light beam from an objective lens, a first reflection face for reflecting the light beam received through said entrance face, a second reflection face inclined with respect to said entrance face to further reflect the light beam reflected by said first reflection face, a roof type third reflection face for reflecting the light beam reflected from said second reflection face, and a fourth reflection face for reflecting the light beam reflected from said third reflection face to an exit aperture, whereby the light beam is turned to a desired direction; and
   an eyepece lens for receiving the light beam passed through said exit aperture and for observing an object image from said objective optical system.

2. An optical apparatus according to claim 1, further comprising:
   a focusing screen arranged on an objective lens side of said first reflection face.

3. An optical apparatus according to claim 1, further comprising:
   a focusing screen arranged between said first reflection face and said second reflection face.

4. An optical apparatus according to claim 1, wherein said optical means includes a plurality of prisms.

5. An optical apparatus according to claim 1, wherein after reflection from said first reflection face, the axis of the light beam reflected by said second reflection face is substantially parallel with an optical axis of said eyepiece lens.

6. A finder comprising:
   (a) a first prism having an entrance face and first reflection means;
   (b) a second prism having second reflection means for reflecting a light path reflected by said first reflection means;
   (c) a third prism having third reflection means for reflecting a light path reflected by said second reflection means and fourth reflection means for reflecting a light path reflected by said third reflection means to an exit face; and
   (d) an eyepiece lens in a light path from said exit, whereby the light path connection said first reflection means and said second reflection means is substantially parallel with the light path passing through said eyepiece lens.

7. A finder according to claim 6, wherein said first, said second and said third prisms are unified.

8. A finder according to claim 7, further comprising:
   a focusing screen arranged adjacent to said first prism.

9. A finder according to claim 6, wherein said first prism and said second prism are spaced apart from each other, and said second and said third prisms are unified.

10. A finder according to claim 9, further comprising:
    a focusing screen arranged between said first prism and said second prism.

11. A camera apparatus comprising:
    (a) beam splitting means for splitting a first light path of an objective lens into second and third light paths;
    (b) image receiving means arranged on said second light path to receive an image of an object;
    (c) a prismatic optical arrangement positioned on said third light path and having first, second, third and fourth reflection faces for reflecting said third light path successively, whereby the object image is inverted laterally; and
    (d) an eyepiece lens arranged on the third light path emerging from said prismatic optical arrangement to observe the object image, whereby the light path connection said first reflection face with said second reflection face is substantially parallel with said first light path.

12. A camera apparatus according to claim 11, further comprising:
    a focusing screen between said light beam splitting means and said prismatic optical arrangement.

13. A camera apparatus according to claim 12, further comprising:
    a correction plate between said beam splitting means and said focusing screen to correct object image quality.

14. A camera apparatus according to claim 11, further comprising:

a focusing screen between said first reflection face and said second reflection face.

15. A camera apparatus according to claim 11, further comprising:

a low pass filter between said image receiving means and said beam splitting means.

16. A camera apparatus according to claim 15, wherein said image receiving means includes a semi-conductor solid state image pickup device.

* * * * *